(12) United States Patent
Vyas

(10) Patent No.: US 8,294,320 B2
(45) Date of Patent: Oct. 23, 2012

(54) INTERIOR PERMANENT MAGNET MACHINE

(75) Inventor: Rajeev Vyas, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 12/707,133

(22) Filed: Feb. 17, 2010

(65) Prior Publication Data

US 2011/0198959 A1    Aug. 18, 2011

(51) Int. Cl.
   *H02K 21/12*    (2006.01)
(52) U.S. Cl. ......... 310/156.57; 310/156.53; 310/156.56; 903/906
(58) Field of Classification Search .................. 310/112, 310/156.21, 156.38, 156.53, 156.56, 156.57; 903/906; *H02K 21/12*
   See application file for complete search history.

(56) References Cited

U.S. PATENT DOCUMENTS

| | | | | |
|---|---|---|---|---|
| 4,939,398 | A * | 7/1990 | Lloyd | 310/156.53 |
| 6,684,483 | B2 * | 2/2004 | Rahman et al. | 29/596 |
| 7,309,938 | B1 * | 12/2007 | Smith | 310/113 |
| 7,474,029 | B2 * | 1/2009 | Rahman et al. | 310/156.56 |
| 2004/0245881 | A1 * | 12/2004 | Kadoya et al. | 310/185 |
| 2006/0186752 | A1 * | 8/2006 | Matsumoto et al. | 310/156.53 |
| 2008/0103632 | A1 * | 5/2008 | Saban et al. | 700/286 |
| 2008/0136281 | A1 * | 6/2008 | Fujii et al. | 310/156.08 |
| 2008/0179980 | A1 * | 7/2008 | Dawsey et al. | 310/156.53 |
| 2009/0026868 | A1 * | 1/2009 | Morgante | 310/156.38 |
| 2009/0140592 | A1 * | 6/2009 | Rahman et al. | 310/156.53 |
| 2009/0140593 | A1 * | 6/2009 | Kaiser et al. | 310/156.53 |
| 2011/0198959 | A1 * | 8/2011 | Vyas | 310/156.21 |

* cited by examiner

*Primary Examiner* — John K Kim
(74) *Attorney, Agent, or Firm* — Quinn Law Group, PLLC

(57) ABSTRACT

An interior permanent magnet (IPM) machine having a rotor and a stator is provided. The rotor includes a radially inner barrier devoid of magnets, and a radially outer barrier having at least one permanent magnet, each barrier having two pockets with one pocket disposed at an angle relative to the other. At least one of the pockets of the inner barrier has a shape of an irregular quadrilateral. At least one of the pockets of the outer barrier has a substantially trapezoidal shape with a first side generally parallel to a second side, wherein the first side has a portion slanted relative to the third side. In such an IPM machine, demagnetization of the outer barrier magnet is limited when operating temperatures and electrical current exceed operating conditions prescribed by design specifications.

16 Claims, 2 Drawing Sheets

INTERIOR PERMANENT MAGNET MACHINE

TECHNICAL FIELD

The invention relates to construction of an interior permanent magnet (IPM) machine or an electric motor.

BACKGROUND OF THE INVENTION

An interior permanent magnet (IPM) machine is a brushless electric motor having permanent magnets embedded in its rotor core. Permanent magnet electric motors are generally reliable, smaller, light, and thermally efficient. In the past, however, permanent magnets have primarily been used on small, low-power electric motors, because of the relative difficulty associated with finding a material capable of retaining a high-strength magnetic field, and rare earth permanent magnet technology being in infancy.

Recent advances in material technology have enabled creation of lower cost high-intensity permanent magnets. These technological advances have facilitated development of compact, high-power permanent magnet machines for high-volume applications, such as for powering a vehicle, i.e. a hybrid or electric vehicle. IPM machines, in particular, are generally characterized by having favorable ratios of output torque versus the motor's physical size, as well as reduced input voltage. IPM machines are typically reliable, in large part because permanent magnets are retained within dedicated slots of the machine's rotor. When supplied with motive energy from an external source, an IPM machine may also function as a generator. As a result, IPM machines have been gaining acceptance in the transportation industry as viable powerplants for electric and/or hybrid electric vehicles.

SUMMARY OF THE INVENTION

An interior permanent magnet (IPM) machine is provided. The IPM machine includes a stator disposed concentrically around an axis and having a plurality of conductors. The IPM machine also includes a rotor disposed concentrically around the axis and internally with respect to the stator and configured to rotate about the axis relative to the stator. The rotor includes a radially inner barrier having a v-shaped configuration, with a first pocket disposed at a first angle relative to a second pocket, and a radially outer barrier having a v-shaped configuration, with a third pocket disposed at a second angle relative to a fourth pocket. The at least one of the first and the second pockets has a shape of an irregular quadrilateral, and is devoid of magnets. The at least one of the third and the fourth pockets contains a permanent magnet and is characterized by a shape of a polygon having a first side generally parallel to a second side, wherein the first side has a portion slanted relative to the second side. In such an IPM machine, demagnetization of the magnet contained within at least one of the third and the fourth pockets is limited when the IPM machine is overloaded, i.e., when operating temperatures and electrical current of the IPM machine exceed operating conditions prescribed by machine's design specifications.

The portion of the first side may be slanted relative to the second side at an angle within a range of greater than 0 and less than 90 degrees. At least one corner of the at least one of the third and the fourth pockets may be adapted to contain an adhesive to retain the magnet. The first and the second angles may have a substantially equivalent value. The magnet contained within at least one of the third and the fourth pockets may be characterized by a generally rectangular shape. The rotor and the stator each may be configured from six substantially identical interconnected segments disposed side by side along the axis. The operating temperatures and electrical current that exceed operating conditions prescribed by design specifications may occur during a three-phase short circuit, such that the electrical current may reach approximately 1000 Amperes and the operating temperature may reach approximately 250 degrees Celsius.

A vehicle employing the above described IPM machine for propulsion is also provided. As disclosed, the IPM machine is configured to power the vehicle by operating on electrical energy received from an energy-storage device, and to operate as a generator when driven by a motive energy source of the vehicle, that is external to the IPM machine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
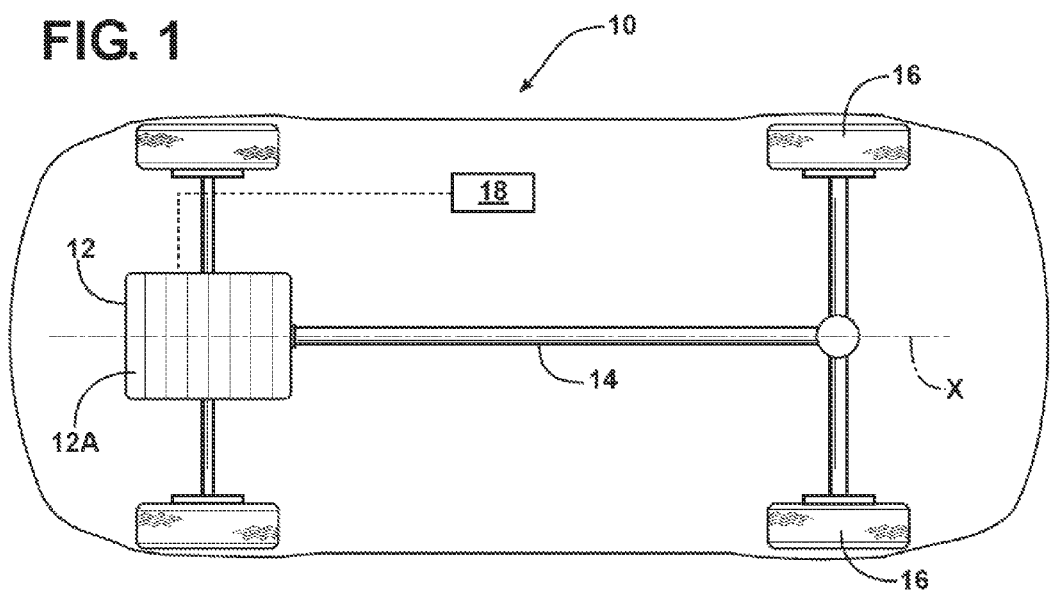
FIG. 1 is a schematic illustration of a vehicle employing a bar-wound interior permanent magnet (IPM) machine for propulsion.

Referring to the drawings, wherein like reference numbers refer to like components, FIG. 1 shows a vehicle 10 employing a bar-wound interior permanent magnet (IPM) motor or machine 12 for propulsion. The term "bar-wound" refers to the individual bar conductors mounted in the stator of the IPM machine. IPM machine 12 is a brushless motor having permanent magnets embedded in its rotor core. IPM machine 12 is shown as being configured from six substantially identical interconnected segments 12A disposed side by side along a rotational axis X of the IPM machine, but may also be configured from either fewer or greater number of such segments. The number of interconnected segments 12A employed in IPM machine 12 is directly related to the torque the IPM machine is capable of producing for powering vehicle 10.

Vehicle 10 includes a driveline 14, including such components as a transmission and a driveshaft (not shown), operatively connected between IPM machine 12 and driven wheels 16 via constant velocity and/or universal joints (not shown), as understood by those skilled in the art. Such operative connection between IPM machine 12 and driveline 14 enables torque developed by IPM machine 12 to power vehicle 10. Vehicle 10 includes an energy-storage device 18. Energy-storage device 18 is configured to supply electrical energy to various vehicle systems (not shown), and is operatively connected to IPM machine 12. IPM machine 12 is configured to power vehicle 10 by operating on electrical energy received from energy-storage device 18, and to operate as a generator when driven by a motive energy source of the vehicle that is external to the IPM machine. Such external motive energy may, for example, be provided by an internal combustion engine (not shown), or by driven wheels 16 via vehicle inertia.

Figure 2:
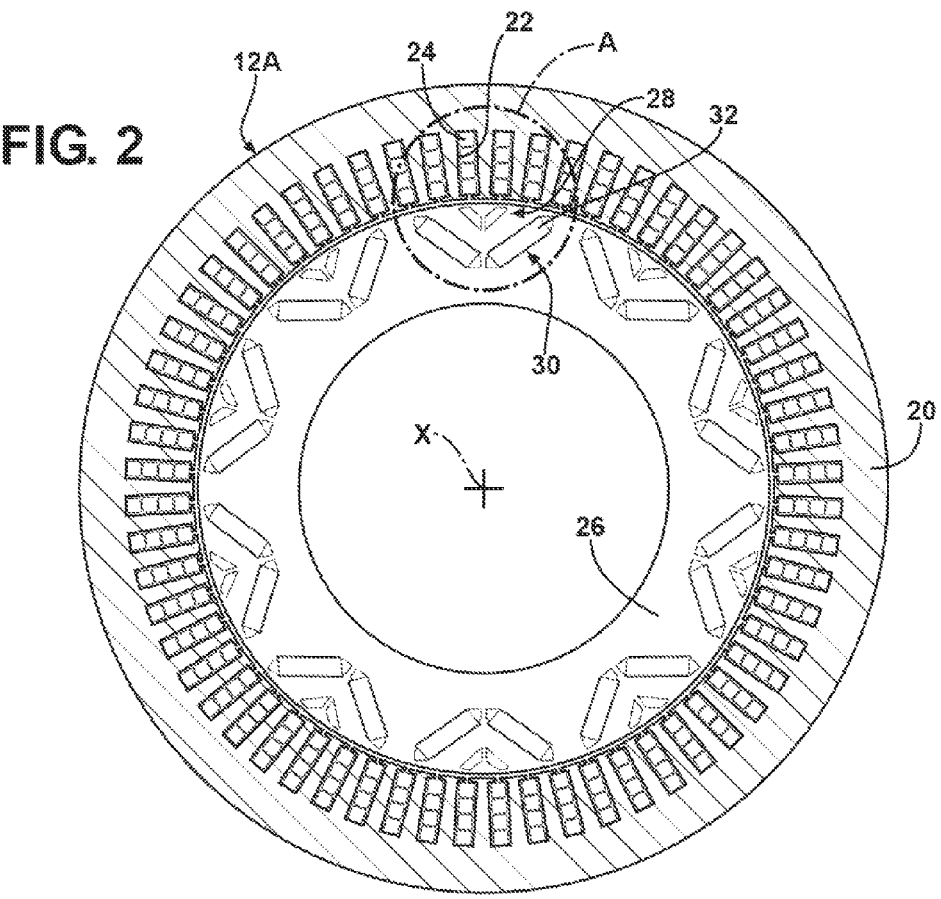
FIG. 2 is a cross-sectional view of a portion of the IPM machine shown in FIG. 1 having a rotor with a radially inner barrier containing permanent magnets and a radially outer barrier containing no magnets.

FIG. 2 shows a cross-sectional view of a portion of IPM machine 12 shown in FIG. 1. IPM machine 12 includes a stator 20 having slots 22 containing conductor bars 24. Conductor bars 24 may be formed out of copper, aluminum, or any other suitable electrically conductive material, and have either a generally rectangular, cuboid or a cylindrical shape. Slots 22 are shown as containing four conductor bars 24 per slot 22, but either a greater or a smaller number of conductor bars 24 may be contained in each slot. A rotor 26 is disposed concentrically around axis X, and includes radially outer barriers 28 containing no magnets and radially inner barriers 30 containing permanent magnets 32. Permanent magnets 32 are shown as having a generally rectangular, cuboid shape. During operation of IPM machine 12, rotor 26 revolves around axis X in response to the magnetic flux developed between conductor bars 24 and magnets 32, thereby generating drive torque to power vehicle 10.

Figure 3:
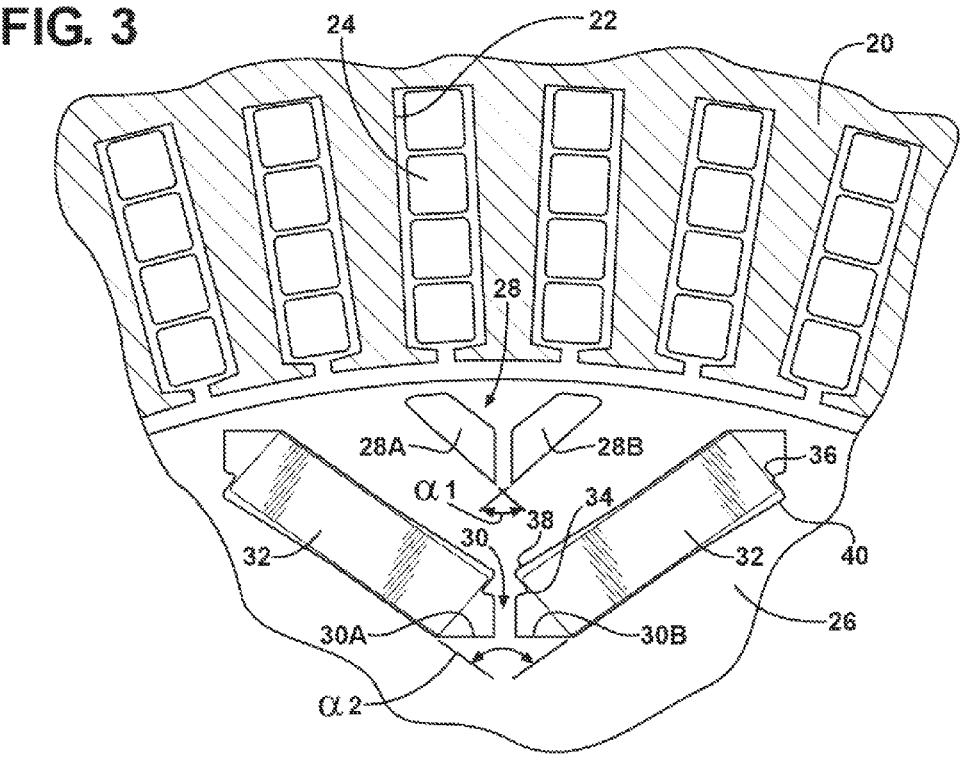
FIG. 3 is a close-up view of the circled area A of the IPM machine, illustrating the radially inner barrier shown in FIG. 2 with a permanent magnet installed.

A circled area A contains a single radially outer barrier 28 together with a single radially inner barrier 30 containing a permanent magnet 32, as well as a portion of stator 20. Outer barrier 28 and inner barrier 30 each include a pair of identical pockets, wherein the pockets of each pair are disposed at an angle with respect to one another, thereby forming a barrier having a v-shaped configuration. Outer barrier 28 includes pockets 28A and 28B, as shown in FIG. 3, wherein pocket 28A is disposed at an angle $\alpha1$ with respect to pocket 28B. Inner barrier 30 includes pockets 30A and 30B, wherein pocket 30A is disposed at an angle $\alpha2$ with respect to pocket 30B. Angles $\alpha1$ and $\alpha2$ may either have a dissimilar or a substantially equivalent magnitude. As shown, pockets 30A and 30B each contain a single magnet 32.

Figure 4:
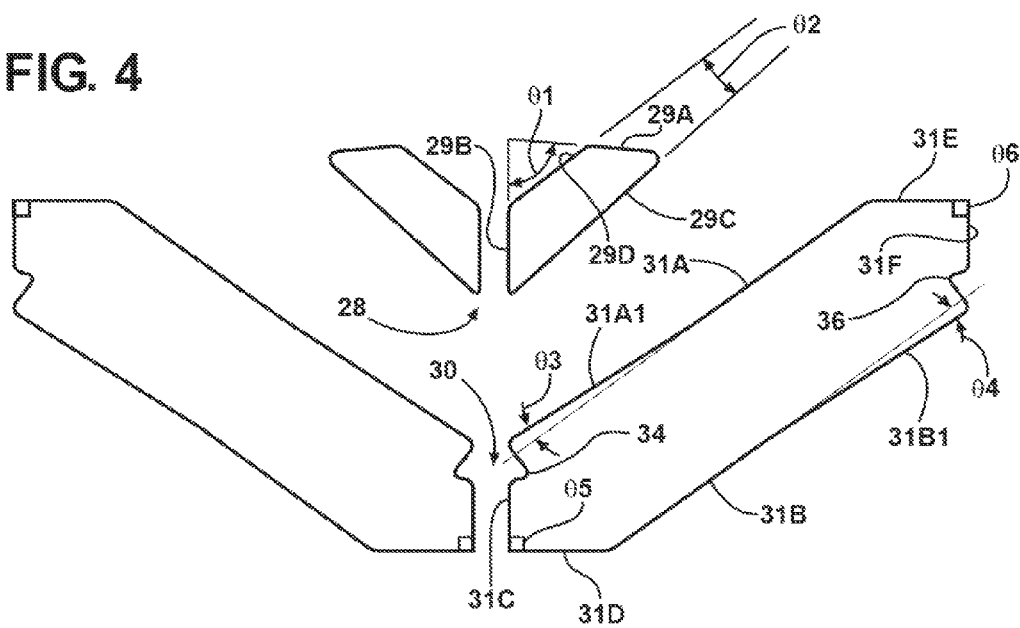
FIG. 4 is a close-up view of the circled area A shown in FIG. 3 with the radially inner barrier permanent magnet removed.

FIGS. 3 and 4 each show a close-up view of the circled area A of the IPM machine 12, illustrating representative shapes of outer barriers 28 and inner barriers 30. In FIG. 3, inner barrier 30 is shown with permanent magnet 32 installed. In FIG. 4, inner barrier 30 of FIG. 2 is shown with permanent magnets 32 removed for ease of showing the shape of the inner barrier. Pockets 28A and 28B of outer barrier 28 are each characterized by a shape of an irregular quadrilateral, having four sides 29A, 29B, 29C, and 29D, with none of the four sides being parallel to any of the remaining three sides. Side 29A is disposed at an angle $\theta1$ with respect to side 29B, while side 29C is disposed at an angle $\theta2$ with respect to side 29D. The shape of inner barriers 28 act as a flux guide for magnets 32 disposed within barrier 30, to thereby reduce iron loss and leakage of magnetic flux between individual magnets 32 in the IPM machine 12. As noted previously, inner barriers 28 are entirely devoid of magnets, such that the weight of IPM machine 12, as well as the cost and the required assembly time, is reduced.

Pockets 30A and 30B of inner barrier 30 are each characterized by a general shape of a polygon having six sides, 31A, 31B, 31C, 31D, 31E and 31F. Side 31A is generally parallel to side 31B. Each inner barrier pocket, 30A and 30B, includes projections 34 and 36. Projections 34 and 36 serve to retain magnet 32, as shown in FIGS. 3 and 4. Side 31A has a portion 31A1 that is slanted with respect to side 31B at angle $\theta3$, and side 31B has a portion 31B1 that is slanted with respect to side 31A at angle $\theta4$. Angles $\theta3$ and $\theta4$ may have a value within a range of greater than 0 and less than 90 degrees. Side 31C is disposed with respect to side 31D at an angle $\theta5$, which is shown as a right angle, and side 31E is disposed with respect to side 31F at an angle $\theta6$, which is also shown as a right angle, although angles $\theta4$ and $\theta5$ may also have different magnitudes.

As seen in FIG. 3, slanted portions 31A1 and 31B1 of each pocket 30A and 30B form gaps 38 and 40, respectively, between magnet 32 and the respective pocket. Gaps 38 and 40 are adapted to contain an adhesive, as understood by those skilled in the art, to retain magnet 32 inside the respective pocket 30A and 30B. The angles of slanted portions 31A1 and 31B1 may be employed at any intersection of pocket sides, such as the intersection of sides 31A and 31E, and intersection of sides 31B and 31D. Likewise, such angles may also be employed at any intersection of sides of pockets 28A and 28B. Each of the gaps 38 and 40 may additionally be characterized by a rounded corner that is raised with respect to slanted portions 31A1 and 31B1, respectively, where each of the slanted portions 31A1 and 31B1 meet projections 34 and 36 (not shown).

As known by those skilled in the art, a permanent magnet is made from a magnetically hard ferromagnetic material which after being magnetized creates and retains its own persistent magnetic field. Typically, a ferromagnetic material may be demagnetized completely when heated past its Curie temperature (for instance 768 degrees C. or 1414 degrees F. for iron), such that molecular motion within the magnetic material destroys alignment of the magnetic domains, as understood by those skilled in the art. Above its Curie temperature, a material is paramagnetic, so that magnetic moments are in a completely disordered state. A magnet may additionally lose some degree of magnetization as the temperature is increased toward the Curie point, such that the alignment (magnetization) within each domain decreases.

At times, while powering vehicle 10, IPM machine 12 may be subjected to an overload as compared to normal operating conditions and load limits prescribed by machine's design specifications, such as a three-phase short circuit, as understood by those skilled in the art. During such conditions, electrical current running through the electrical circuit connected to IPM machine 12 may approach and possibly exceed 1000 Amperes, while operating temperatures may approach and exceed 250 degrees Celsius. Such elevated current and temperature may damage alignment of the magnetic domains of magnets 32, thereby commencing demagnetization of the magnets.

Typically, demagnetization of magnets 32 in IPM machine 12 begins at the corners of the magnets, near projections 34 and 36, and manifests itself as magnetic flux at either the magnet's north or south pole changing direction to act partially or entirely as an opposite pole, as understood by those skilled in the art. Such a change may be either temporary or in some cases permanent, thereby degrading performance of the IPM machine 12. The construction of outer barriers 28 and inner barriers 30 controls leakage of magnetic flux between individual magnets 32 and reluctance, i.e., magnetic resistance, of the magnetic circuit, thereby increasing reluctance torque component of magnets 32, as understood by those skilled in the art. As a result, in spite of elevated current and temperature, even under extreme operating conditions such as a three-phase short circuit, the disclosed construction of outer and inner barriers 28 and 30 guides or bends magnetic flux paths of magnets 32 back toward their intended direction, in order to limit demagnetization of the magnets. Reduced demagnetization of magnets 32 under extreme operating conditions, in turn retains reliability and function of IPM machine 12.

While the best modes for carrying out the invention have been described in detail, those familiar with the art to which this invention relates will recognize various alternative designs and embodiments for practicing the invention within the scope of the appended claims.

The invention claimed is:

1. An interior permanent magnet (IPM) machine comprising:
    a stator having a plurality of conductors, the stator disposed concentrically around an axis; and
    a rotor disposed concentrically around the axis and internally with respect to the stator, and configured to rotate about the axis relative to the stator, the rotor including a radially outer barrier having a first pocket disposed at a first angle relative to a second pocket thereby forming the outer barrier having a first v-shaped configuration, and a radially inner barrier having a third pocket disposed at a second angle relative to a fourth pocket thereby forming the inner barrier having a second v-shaped configuration;
    wherein:
        at least one of the first and the second pockets is characterized by a shape of an irregular quadrilateral, and is devoid of magnets; and
        at least one of the third and the fourth pockets contains a permanent magnet and is characterized by a general shape of a polygon having a first side generally parallel to a second side, and the first side has a portion slanted relative to the second side, such that demagnetization of the magnet contained within at least one of the third and the fourth pockets is limited when operating temperatures and electrical current of the IPM machine exceed operating conditions prescribed by design specifications.

2. The IPM machine according to claim 1, wherein the portion of the first side is slanted relative to the second side at an angle within a range of greater than 0 and less than 90 degrees.

3. The IPM machine according to claim 1, wherein at least one corner of the at least one of the third and the fourth pockets is adapted to contain an adhesive to retain the magnet.

4. The IPM machine according to claim 1, wherein the first and the second angles have a substantially equivalent value.

5. The IPM machine according to claim 1, wherein the magnet contained within at least one of the third and the fourth pockets is characterized by a generally rectangular shape.

6. The IPM machine according to claim 1, wherein the rotor and the stator are each configured from six substantially identical interconnected segments disposed side by side along the axis.

7. The IPM machine according to claim 1, wherein the operating temperatures and electrical current that exceed operating conditions prescribed by design specifications occur during a three-phase short circuit.

8. The IPM machine according to claim 7, wherein the three-phase short circuit electrical current reaches approximately 1000 Amperes and the three-phase short circuit temperatures reach approximately 250 degrees Celsius in the rotor.

9. A vehicle comprising:
    an energy-storage device configured to supply electrical energy; and
    an interior permanent magnet (IPM) machine configured to power the vehicle by operating on electrical energy received from the energy-storage device, and to operate as a generator when driven by a motive energy source of the vehicle that is external to the IPM machine, the IPM machine including:
        a stator having a plurality of conductors, the stator disposed concentrically around an axis;
        a rotor disposed concentrically around the axis and internally with respect to the stator, and configured to rotate about the axis relative to the stator, the rotor including a radially outer barrier having a first pocket disposed at a first angle relative to a second pocket thereby forming the outer barrier having a first v-shaped configuration, and a radially inner barrier having a third pocket disposed at a second angle relative to a fourth pocket thereby forming the inner barrier having a second v-shaped configuration; and
        a shaft disposed concentrically around the axis and operatively connected to the rotor for transmitting torque from the IPM machine to drive the vehicle;
        wherein:
            at least one of the first and the second pockets is characterized by a shape of an irregular quadrilateral, and is devoid of magnets; and
            at least one of the third and the fourth pockets contains a permanent magnet and is characterized by a substantially trapezoidal shape having a first side generally parallel to a second side, and the first side has a portion slanted relative to the second side, such that demagnetization of the magnet contained within at least one of the third and the fourth pockets is limited when operating temperatures and electrical current of the IPM machine exceed operating conditions prescribed by design specifications.

10. The vehicle according to claim 9, wherein the portion of the first side is slanted relative to the second side at an angle within a range of greater than 0 and less than 90 degrees.

11. The vehicle according to claim 9, wherein at least one corner of the at least one of the third and the fourth pockets is adapted to contain an adhesive to retain the magnet.

12. The vehicle according to claim 9, wherein the first and the second angles have a substantially equivalent value.

13. The vehicle according to claim 9, wherein the magnet contained within at least one of the third and the fourth pockets is characterized by a generally rectangular shape.

14. The vehicle according to claim 9, wherein the rotor and the stator are each configured from six substantially identical interconnected segments disposed side by side along the axis.

15. The vehicle according to claim 9, wherein the operating temperatures and electrical current that exceed operating conditions prescribed by design specifications occur during a three-phase short circuit.

16. The vehicle according to claim 15, wherein the three-phase short circuit electrical current reaches approximately 1000 Amperes and the three-phase short circuit temperatures reach approximately 250 degrees Celsius in the rotor.

* * * * *